United States Patent Office 3,317,428
Patented May 2, 1967

3,317,428
ORGANOSILICON HYDRAULIC FLUIDS
Anton S. Pater, Williamsville, N.Y., assignor to Union Carbide Corporation, a corporation of New York
No Drawing. Filed June 29, 1966, Ser. No. 561,349
3 Claims. (Cl. 252—75)

This application is a continuation-in-part of my application Ser. No. 258,887, filed Feb. 15, 1963, now abandoned.

This invention relates to novel organosilicon oils having improved viscosity characteristics at elevated temperatures. It further relates to improved hydraulic fluids.

Organopolysiloxane oils are known in the art to be useful at temperatures approaching 200° C. As the operating temperature exceeds 200° C., the fluid begins to break down through depolymerization. Gradually, the viscosity decreases and finally a gel begins to form. Some improvement is obtained in the overall high temperature properties by addition of an organic or inorganic antioxidant. This helps prevent gel formation through improvement of resistance to oxidative degradation. However, such additives do not help the lowering of viscosity caused by high temperature depolymerization.

In many industrial applications of organopolysiloxane oils, it is highly desirable that substantially constant viscosity characteristics are maintained. This is particularly true in torque converters. In a torque converter, the organopolysiloxane oil acts as a fluid clutch between the input and output connections. It is desirable that the relationship between the rotational input and rotational output remain subsantially constant over a wide range of operating temperatures. If the viscosity of the organopolysiloxane oil begins to decrease at elevated temperatures, the fluid clutch will begin to "slip" and decrease its transfer of energy from the input to the output connections.

It is therefore a principal object of the present invention to provide organopolysiloxane oils having substantially constant viscosity characteristics, especially at elevated temperatures.

It has been found that when a cyclic diorganosiloxane depolymerizate is added to an organopolysiloxane oil, the resulting blend has substantially constant viscosity characteristics, especially at elevated temperature. The cyclic diorganopolysiloxane depolymerizate which is added to the organopolysiloxane oil to form a blend having improved viscosity characteristics is a well known material prepared by well known techniques. It is known that heating a high molecular weight diorganopolysiloxane will produce quantities of a cyclic diorganopolysiloxane depolymerizate which consists of a mixture of lower molecular weight cyclics such as the trimer, tetramer and pentamer. U.S. 2,455,999 teaches a method of preparing cyclic diorganosiloxanes by heating high molecular weight siloxanes in the presence of alkali metal hydroxides to improve the yield of cyclics. U.S. 2,860,152 describes a method for obtaining improved yields of cyclic diorganopolysiloxane depolymerizate by heating a high-boiling organopolysiloxane in the presence of an inert high-boiling solvent and a basic catalyst. When a dimethylpolysiloxane, for example, is used as a starting material in these depolymerization processes, the cyclic depolymerizate product is a mixture of low molecular weight cyclic dimethylsiloxane polymers, principally cyclic dimethylsiloxane tetramer.

The amount and composition of the cyclic diorganopolysiloxane depolymerizate added to the oil will depend upon the composition of the starting oil and the desired characteristics of the final blend. It has been found useful to add from about 5 to about 25 weight percent (based on total mixture weight) of cyclic diorganopolysiloxane depolymerizate to an organopolysiloxane oil in order to improve the viscosity characteristics. In order to achieve maximum compatibility between the oil and the added cyclic depolymerizate, it is generally desirable that the organo substituents on the oil and the cyclic depolymerizate be the same. A dimethylsiloxane cyclic depolymerizate is thus used for addition to a dimethylpolysiloxane oil. The present invention is not so limited, however. When the blend is to be used at operating temperatures in excess of about 250° C., it may be desirable to employ a cyclic depolymerizate having different organic substituents, such as diethyl, diphenyl, ethylphenyl and the like, for addition to a dimethylpolysiloxane oil.

In order for the blends of the present invention to maintain the desired viscosity characteristics over long operating periods, the blend must be used in a closed system with minimal venting of vapors. Otherwise, the relatively lower boiling point cyclic diorganopolysiloxane depolymerizate would be lost through volatilization. Preferably, the atmosphere over the blend is inert so as to minimize degradation of the blend constituents. Such condition could be maintained by nitrogen pressurization of the system.

The organopolysiloxane oils employed in the blends of the present invention generally are dihydrocarbonpolysiloxane oils end-blocked with alkoxy or hydroxy groups. These oils are more readily depicted as having the general formula:

wherein R is a member selected from the group consisting of hydrocarbon radicals, halo-substituted hydrocarbon radicals, cyanoalkyl radicals, aminoalkyl radicals and carboxyalkyl radicals; $R^1$ is a member selected from the group consisting of alkyl radicals and hydrogen; $a$ has a value of from 0 to 2 inclusive; $b$ has a value of from 0 to 3 inclusive; $x$ has a value of at least 1; and R as well as $R^1$ can be the same or different groups throughout the molecule. Such compounds are well known in the art and are prepared by well known techniques. They are described in U.S. 2,909,549.

It is preferred that an antioxidant be present in the blends of the present invention when operating temperatures above 200° C. are encountered. The various antioxidants known in the art for organosiloxane fluids can be employed. It is especially preferred to employ the antioxidant compositions disclosed and claimed in copending application Ser. No. 258,897, now abandoned, filed Feb. 15, 1963. Examples of such preferred antioxidants are

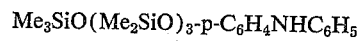

and

wherein "Me" designates a methyl radical.

This invention is further illustrated by the following examples.

*Example I*

An organopolysiloxane oil blend having a viscosity of 6000 centistokes at 25° C. was obtained by mixing about 9 weight percent cyclic dimethylpolysiloxane depolymerizate (predominantly dimethylsiloxane cyclic tetramer) and about 91 weight percent dimethylpolysiloxane oil having a viscosity of 10,000 centistokes at 25° C. To this blend was added 0.2 weight percent (based on weight or blend)

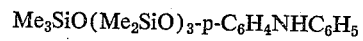

This final mixture was placed as the fluid clutch in a torque converter. The input to the torque converter was connected to an electric motor. The output from the torque converter was connected to a fan. The motor was started at an input speed to the torque converter of 2460 r.p.m. The motor was operated continuously for two hours, then rested for one hour. The operation was then repeated. Temperatures in the fluid reached 480° F. (249° C.) to 550° F. (288° C.). After 18 hours of operation, the converter was still delivering an output of 2490 r.p.m. This fluid thus maintained desirable viscosity characteristics and also resisted gelling caused by oxidative degradation.

Similar tests using the same blend of oil and depolymerizate but with conventional organic antioxidants delivered satisfactory r.p.m. outputs but the tests failed in 5–10 hours because of oxidative degradation.

Similar tests employing a 6000 centistokes blend of organopolysiloxane oils not containing cyclic depolymerizate resulted in rapid r.p.m. output decrease in 1–2 hours at the above temperatures. The output dropped from 2420 r.p.m. to 2100 r.p.m., for example.

*Example II*

An organopolysiloxane oil blend having a viscosity of 6030 centistokes at 25° C. was obtained by mixing about 9 weight percent cyclic dimethylpolysiloxane depolymerizate (predominantly dimethylsiloxane cyclic tetramer) and about 91 weight percent dimethylpolysiloxane oil having a viscosity of 10,000 centistokes at 25° C. To this blend was added 0.2 weight percent (based on weight of blend)

p-C₆H₅NHC₆H₄O(Me₂SiO)₇.₅-p-C₆H₄NHC₆H₅

A 75 ml. fluid sample of this final mixture was placed in a 125 ml. Erlenmeyer flask with a ground glass joint. This closed system was then heated at 250° C. in a forced air oven. After 20 hours the viscosity decreased 1.8 percent. After 60 hours, the viscosity had decreased only 2.6 percent. These results indicate the desirable features of the novel blends of the present invention.

Various antioxidants, such as phenanthrene, phenyl-alpha-naphthylamine, phenothiazine, 2,6-di-(tert-butyl)-4-methylphenol, diphenyl-para-phenylene diamine, iron octoate and disalicylalpropylenediaminecerium chelate, could also be used in the blends of the present invention. The following example describes use of such antioxidants.

*Example III*

An organopolysiloxane oil blend having a viscosity of about 6000 centistokes at 25° C. was obtained by mixing about 9 weight percent cyclic dimethylpolysiloxane depolymerizate (predominantly dimethylsiloxane cyclic tetramer) and about 91 weight percent dimethylpolysiloxane oil having a viscosity of 10,000 centistokes at 25° C. To this blend was added about 0.02 weight percent diphenyl-para-phenylene diamine. A 75 ml. fluid sample of this final mixture was placed in a 125 ml. Erlenmeyer flask with a ground glass joint. This closed system was then heated at 250° C. in a forced air oven. After 60 hours, the viscosity had decreased only 3.0 percent.

The novel blends of the present invention employing cyclic diorganosiloxanes added to organopolysiloxane oils can be used even without antioxidants and still have improved viscosity characteristics. This is shown by the following example.

*Example IV*

A 75 ml. portion of the blend of Example I without any antioxidant being present was placed in a 125 ml. Erlenmeyer flask with a ground glass joint. This closed system was then heated at 250° C. in a forced air oven. After 60 hours, the viscosity had decreased only 7.6 percent.

While the above examples all employed cyclic diorganopolysiloxane depolymerizate as the additive to the oil, it is understood that the present invention includes the addition of any cyclic diorganosiloxane, such as dimethylsiloxane cyclic tetramer.

The novel blends of the present invention are particularly useful as hydraulic fluids and can be used in a manner similar to prior art hydraulic fluids.

What is claimed is:

1. A hydraulic fluid consisting essentially of a blend of from about 95 to about 75 weight percent of an organopolysiloxane oil having the formula:

$$(R^1O)_{3-a}R_aSiO(R_2SiO)_xSiR_b(OR^1)_{3-b}$$

wherein R is a hydrocarbon radical, a halo-substituted hydrocarbon radical, a cyanoalkyl radical, an aminoalkyl radical, or a carboxylalkyl radical; $R^1$ is an alkyl radical or hydrogen; $a$ is 0, 1 or 2; $b$ is 0 or an integer of from 1 to 3; and $x$ has a value of at least 1, and from about 5 to about 25 weight percent of a cyclic diorganopolysiloxane depolymerizate which consists essentially of a mixture of cyclic diorganopolysiloxane trimer, cyclic diorganopolysiloxane tetramer and cyclic diorganopolysiloxane pentamer.

2. A hydraulic fluid as claimed in claim 1, consisting essentially of from about 95 to about 75 weight percent of a dimethylpolysiloxane oil and from about 5 to about 25 weight percent of dimethylsiloxane cyclic tetramer.

3. A hydraulic fluid as claimed in claim 2, comprising about 91 weight percent dimethylpolysiloxane oil having a viscosity of 10,000 centistokes at 25° C., and about 9 weight percent cyclic dimethylpolysiloxane depolymerizate which consists essentially of a mixture of cyclic dimethylsiloxane trimer, cyclic dimethylsiloxane tetramer, and cyclic dimethylsiloxane pentamer.

References Cited by the Examiner

UNITED STATES PATENTS 2,527,808  10/1950  Goodwin _____ 252—78 X
2,920,044   1/1960  Daudt _____ 252—78

LEON D. ROSDOL, *Primary Examiner.*

S. D. SCHWARTZ, *Assistant Examiner.*